(12) United States Patent
Chuman (10) Patent No.: US 9,550,638 B1
(45) Date of Patent: Jan. 24, 2017

(54) DEVICES AND METHODS FOR COLLECTING AND HAULING MATERIALS

(71) Applicant: Andrew Chuman, Sanford, NC (US)

(72) Inventor: Andrew Chuman, Sanford, NC (US)

( * ) Notice: Subject to any disclaimer, the term of this patent is extended or adjusted under 35 U.S.C. 154(b) by 0 days.

(21) Appl. No.: 14/817,752

(22) Filed: Aug. 4, 2015

(51) Int. Cl.
  *B65F 5/00* (2006.01)
  *B65G 65/28* (2006.01)
  *B62B 15/00* (2006.01)
  *A01G 1/12* (2006.01)

(52) U.S. Cl.
  CPC ................. *B65G 65/28* (2013.01); *A01G 1/12* (2013.01); *B62B 15/00* (2013.01)

(58) Field of Classification Search
  CPC ........... A01G 1/12; B65G 65/28; B62B 15/00; B65F 2240/138
  See application file for complete search history.

(56) References Cited

U.S. PATENT DOCUMENTS

| | | | |
|---|---|---|---|
| 2,974,971 A | 3/1961 | Buck | |
| 3,355,187 A | 11/1967 | Brindle | |
| 3,771,808 A | 11/1973 | Duerst | |
| 4,335,891 A | 6/1982 | Alley et al. | |
| 4,366,949 A * | 1/1983 | Staub, Sr. | ............... E04H 17/00 256/1 |
| 5,104,133 A | 4/1992 | Reiner | |
| 5,529,231 A | 6/1996 | Burgess | |
| 6,276,698 B1 | 8/2001 | Calandra | |
| 6,565,101 B2 | 5/2003 | Jones, Jr. et al. | |
| 7,125,060 B2 | 10/2006 | Crutcher | |
| 2007/0290464 A1 | 12/2007 | Mastromatto et al. | |
| 2012/0267909 A1* | 10/2012 | Sandel | ................... A01G 1/125 294/137 |
| 2013/0181416 A1 | 7/2013 | Ross | |

* cited by examiner

*Primary Examiner* — Patrick Maestri
(74) *Attorney, Agent, or Firm* — Coats & Bennett, P.L.L.C.

(57) ABSTRACT

The present application discloses devices for collecting and hauling materials, and methods of using the devices. The devices generally include a post and a sheet. The post includes a number of attachment points and the sheet includes a number of connectors. The connectors are selectively attachable to the attachment points on the post to position the sheet between an open orientation for loading the materials onto the sheet, and a closed orientation for transporting the device with the materials.

15 Claims, 8 Drawing Sheets

DEVICES AND METHODS FOR COLLECTING AND HAULING MATERIALS

BACKGROUND

There are many situations in which it is necessary to collect and haul materials while working outside. One situation is when doing yard work which may include raking leaves, collecting grass that has been cut, and picking up fallen branches. In each of these situations, these materials are collected into a pile and then hauled away for disposal.

An existing way of collecting and hauling the materials is to use a tarp. The tarp is spread out onto the ground in the area where the materials are being collected. The materials are placed on the top of the sheet. Once the collection is complete, the user grabs one or more corners of the sheet and pulls the sheet across the ground to haul the materials away for disposal. At the disposal location, the user pulls the sheet out from underneath the collected materials. Although this manner of collecting and hauling materials has been used by many persons, it has several issues that make it difficult.

One issue is that the collected materials that are positioned on the tarp often fall off during hauling. These materials may fall off one or more of the front side, lateral sides, and back side while the tarp is being pulled by the user across the ground.

Another issue is the difficulty for the user to bundle the edges of the tarp together and hold the edges while hauling the materials. Often, the bundled tarp is too large to fit within the user's hand. Further, the tarp often becomes wet from the materials making the tarp slippery and more difficult to hold together. It is frustrating for a user to maintain their hold on the edges while dragging the tarp across the ground.

A further issue is that the tarp may blow away by the wind when it is initially placed on the ground. In use, the tarp is spread out and placed on the ground prior to loading the materials. The relatively large surface area of the extended tarp and the light-weight of the tarp often cause it to blow away in the wind. Again, this is frustrating for the user who must then bring the tarp back and spread it out on the ground. This seems to happen frequently in the autumn when raking leaves as the wind tends to be stronger during this time of the year.

SUMMARY

The present application is directed to a device for hauling materials, particularly yard debris. One embodiment is directed to a method of loading materials onto a collection device that includes a post with first, second, and third brackets and a sheet with a front edge, an opposing back edge, and opposing first and second lateral edges. The method includes inserting a first end of the post into the ground and positioning the post in an upright position with a first bracket of the post positioned in close proximity to the ground and second and third brackets of the post positioned farther away from the ground. The method includes spreading the sheet out in a flat configuration with a first connector that is attached to a central part of a front edge of the sheet being connected to the first bracket of the post. After the materials are loaded onto the sheet, folding the first lateral edge of the sheet over the materials and inserting the second connector that is attached to the front edge of the sheet at the first lateral edge into the interior space of the second bracket and attaching the second connector to the second bracket with the second connector positioned farther away from the ground than the first connector. The method includes folding the second lateral edge of the sheet over the materials and inserting the third connector that is attached to the front edge of the sheet at the second lateral edge into the interior space of the third bracket and attaching the third connector to the third bracket with the third connector positioned farther away from the ground than the first connector. The method also includes removing the first end of the post from the ground while the connectors remain attached to the post.

The method may also include attaching the second and third connectors to the post at a same distance away from the first end of the post.

The method may also include attaching a fourth connector that is attached to the back edge of the sheet at the first lateral edge onto a fifth connector that is attached to the back edge of the sheet at the central portion.

The method may also include attaching a sixth connector that is attached to the back edge of the sheet at the second lateral edge onto the fifth connector that is attached to the back edge of the sheet at the central portion.

The method may include that attaching the first connector on the central part of the front edge of the sheet to the first bracket of the post includes positioning the central part of the front edge of the sheet above the ground.

The method may also include maintaining a remainder of the sheet on the ground.

The method may include that the first connector is attached to the first bracket of the post after the first end of the post is inserted into the ground.

Another embodiment is directed to a method of loading materials onto a collection device that includes a post with brackets and a rectangular sheet with a front edge having first and second front corners, an opposing back edge with first and second back corners, and opposing lateral sides, the sheet also including a central portion positioned inward from the lateral sides and that extends between the front and back edges. The method includes attaching a front edge of the sheet at the central portion to the post. While the front edge of the sheet at the central portion is attached to the post, inserting the post into the ground and positioning the post in an upright position. The method includes spreading the sheet out on the ground while the sheet is attached to the post. Thereafter, folding the first lateral edge of the sheet over the central portion of the sheet and attaching the first front corner to the post above where the front edge of the sheet at the central portion is attached to the post. The method includes folding the second lateral edge of the sheet over the central portion of the sheet and attaching the second front corner to the post above where the front edge of the sheet at the central portion is attached to the post. The method also includes removing the post from the ground while the sheet remains attached to the post.

The method may include that spreading the sheet out on the ground includes spreading the sheet on the ground in a flat configuration.

The method may include that spreading the sheet out on the ground includes positioning the front edge of the sheet at the central portion above the ground.

The method may include that attaching the front edge of the sheet at the central portion to the post includes attaching a first connector that is attached to the sheet at the front edge to a first bracket on the post. The method may also include attaching a second connector that is attached to the first front corner of the post to a second bracket on the post, with the second bracket being positioned farther away from an end of the post that is inserted into the ground than the first bracket. Further, attaching a third connector that is attached to the second front corner of the post to a third bracket on the post, with the third bracket being positioned farther away from the end of the post that is inserted into the ground than the first bracket.

The method may also include attaching both of the first and second back corners of the sheet to the back edge of the sheet at the central portion.

Another embodiment is directed to a device to haul materials that includes a post. The post includes an elongated body with a sharpened first end and an opposing second end with a handle that is wider than the body, a first bracket with an enclosed interior space that extends laterally outward from the body in proximity to the first end, and at least one additional bracket with an enclosed interior space that extend laterally outward from the body in proximity to the handle. The device also includes a rectangular sheet with a front edge with first and second corners and an opposing back edge with third and fourth corners with each of the front and back edges including three spaced-apart holes. The device also includes connectors mounted within each of the holes with each of the connectors having an interior space and opening into the interior space, an elongated member that extends across the opening, and a biasing member that biases the elongated member across the opening.

The device may include that the second and third brackets are positioned an equal distance from the first bracket along the body of the post.

The device may include that the second bracket extends outward on a first lateral side of the body and the third bracket extends outward on an opposing second lateral side of the body.

The various aspects of the various embodiments may be used alone or in any combination, as is desired.

DETAILED DESCRIPTION

The present application is directed to systems and methods for hauling materials, such as yard debris. The system generally includes a post and a sheet. The post includes a number of attachment points and the sheet includes a number of connectors. The connectors are selectively attachable to the attachment points on the post to position the sheet between an open orientation for loading the materials onto the sheet, and a closed orientation for transporting the device with the materials.

Figure 1:
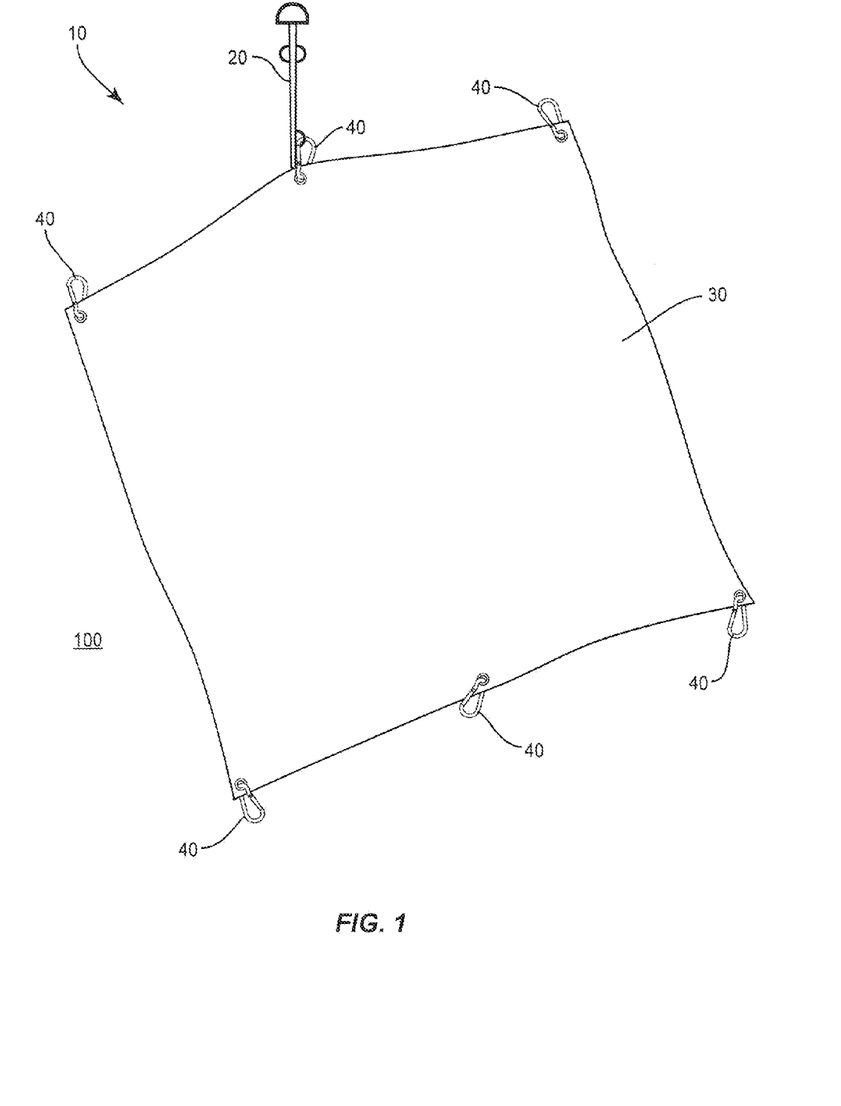
FIG. 1 is a perspective view of a device in an open orientation.

FIG. 1 illustrates a device 10 that includes a post 20 and a sheet 30. The device 10 in FIG. 1 is in the open orientation with the sheet 30 spread out on the ground 100 such that a user can load materials onto the sheet. The post 20 is secured in the ground 100 and may be attached to the sheet 30 through one or more connectors 40 in the open orientation.

In the closed orientation, the outer edges of the sheet 30 are folded over the sheet 30 and additional connectors 40 are attached to the post 20. This closed orientation secures the materials on the sheet 30 and reduces the size of the sheet 30 thus allowing it to be dragged along the ground 100 as necessary to move the materials.

Figure 2:
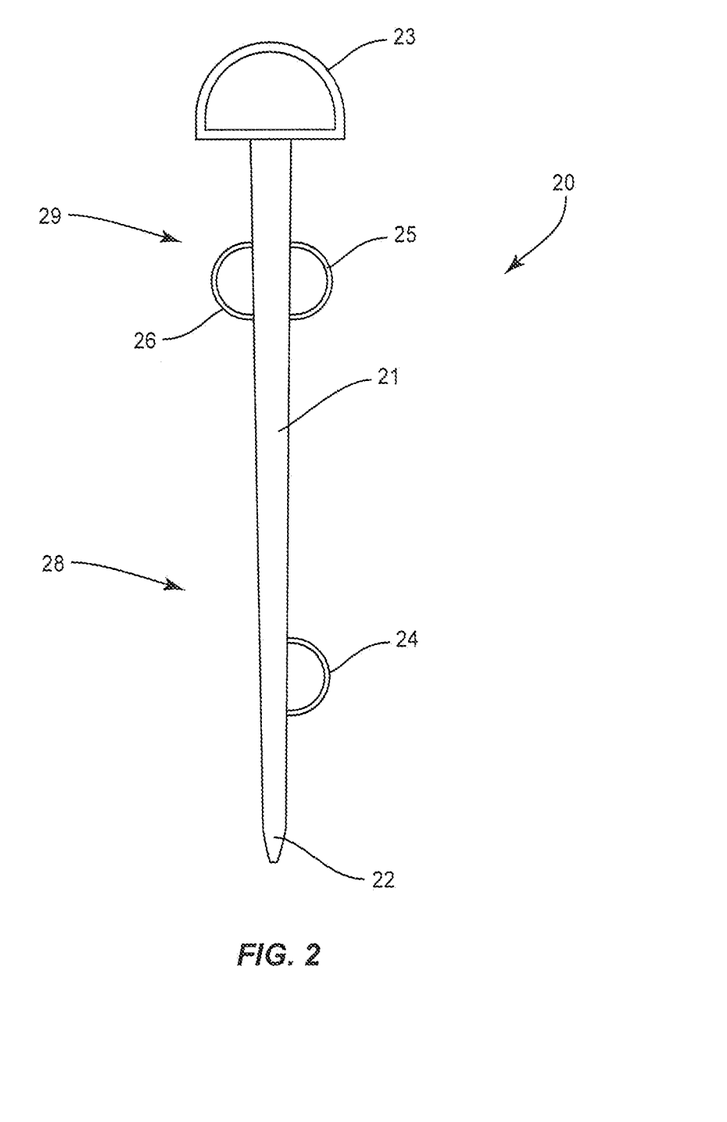
FIG. 2 is a side view of a post.

FIG. 2 illustrates a post 20 that includes an elongated body 21. The body 21 includes a straight shape with a first end 22 configured to be inserted into the ground 100 when in use and a handle 23 on the opposing end. The body 21 may have a variety of lengths measured between the ends. In one embodiment, the length is about three feet. The post 20 may be constructed from various materials, including but not limited to metal such as aluminum or steel, and plastic. The post 20 should be rigid to facilitate positioning it in the ground 100 and for hauling the sheet 30 when filled with materials.

The post 20 includes a first connection section 28 towards a lower portion and a second connection section 29 higher up along the post. The connection sections 28, 29 provide for attaching a connector to secure the sheet 30 to the post 20. The connection sections 28, 29 may each include one or more brackets designed to receive the connectors 40.

FIG. 2 includes the first connection section 28 having a first bracket 24, and second connection section 29 having brackets 25, 26. The brackets 24, 25, 26 extend outward from the post 20 to form an enclosed opening. The brackets 24, 25, 26 may each include the same size and shape, or one or more may include different sizes and/or shapes. FIG. 2 includes a bracket 24 positioned in proximity to the first end 22, and brackets 25, 26 aligned and in closer proximity to the handle 23. This positioning facilitates attachment of the sheet 30 in the open and closed orientations. Bracket 24 is positioned to attach to a center of the sheet 30 and brackets 25, 26 are positioned to attach to the outer edges of the sheet 30 as will be explained in detail below. In another embodiment, the second connection section 29 includes a single bracket that receives multiple different connectors 40 when the device 10 is in the closed orientation. In another embodiment, a top edge of bracket 24 (i.e., the edge towards the handle 23) is flat to form a contact point for a user to step on to drive the post 20 into the ground 100.

Figure 3:
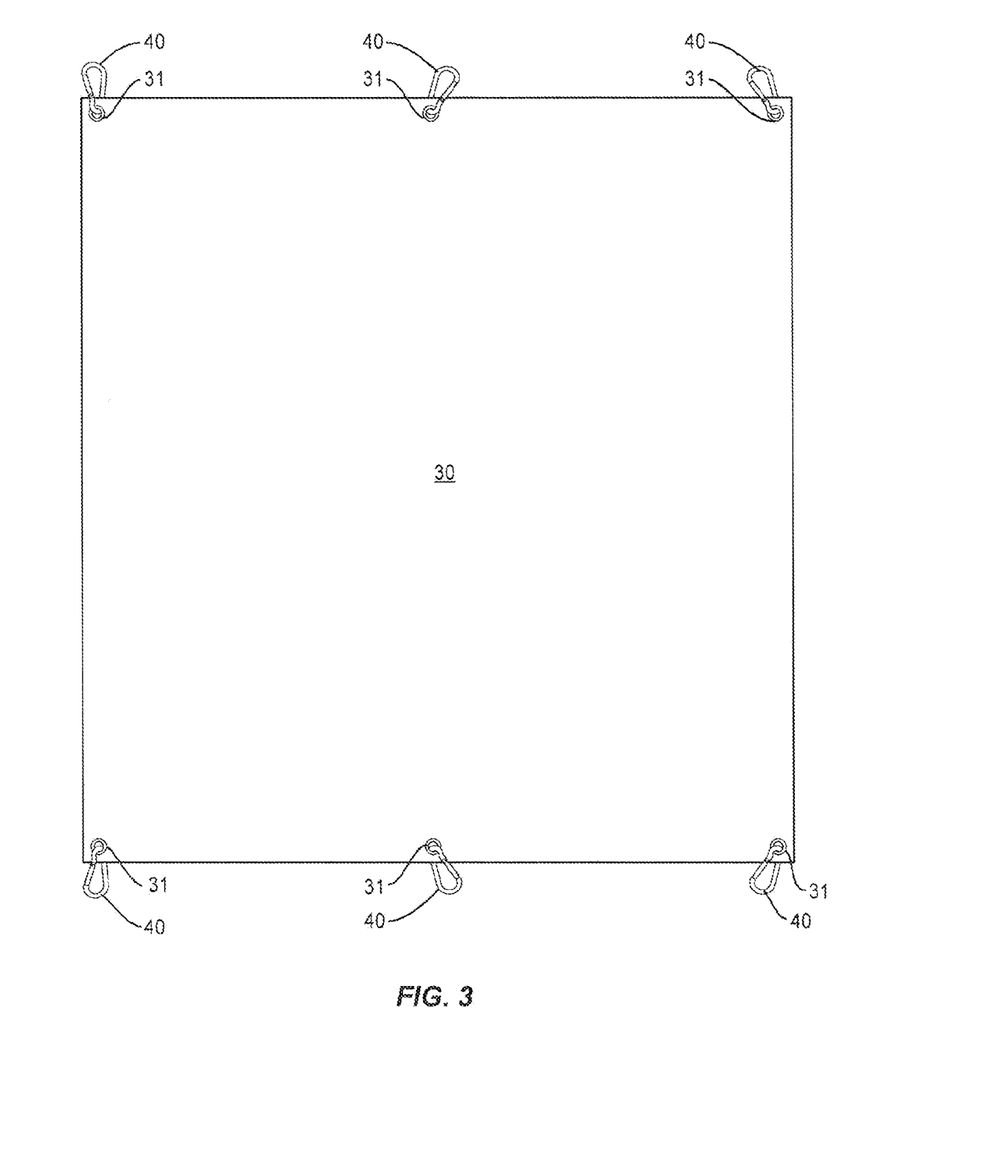
FIG. 3 is a plan view of a sheet in an open orientation.

The sheet 30 is flexible to be movable between the open and closed orientations. The sheet 30 may be constructed from a variety of materials, including but not limited to polyethylene, cotton, plastic, and canvas. The sheet 30 may also include a water-proof coating for use in outdoor environments. The sheet 30 may include a variety of different shapes and sizes. In one embodiment, the sheet 30 has a rectangular shape. Sizes may vary, with specific examples including 12'×16', 10'×8', 16'×20', and 10'×12'. Grommets 31 are positioned in the sheet 30 to form openings to receive the connectors 40. The grommets 31 may be constructed of various materials, such as aluminum, steel, and plastic. FIG. 3 includes grommets 31 positioned in each of the four corners, and at a central section of opposing front and back edges.

Figure 4:
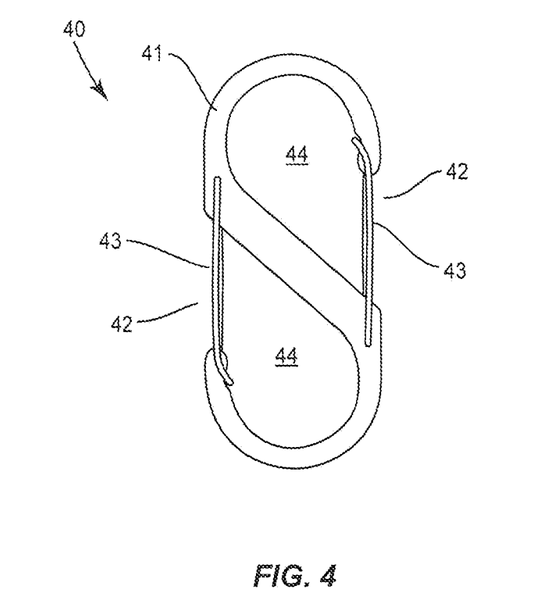
FIG. 4 is a side view of a connector.
Figure 5:
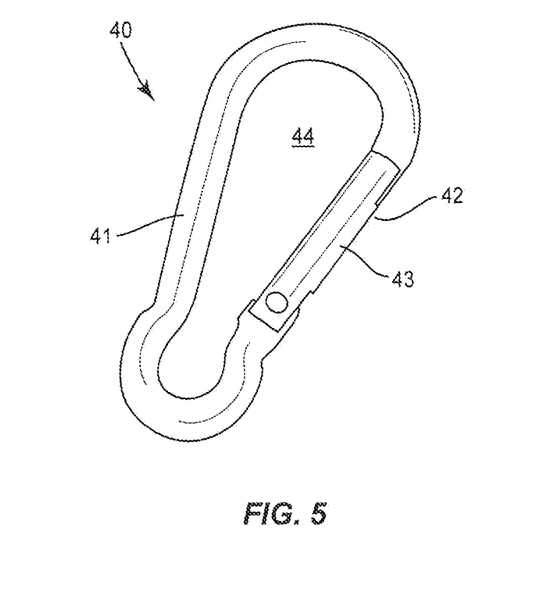
FIG. 5 is a side view of a connector.

The connectors 40 are configured to attach the sheet 30 to the post 20 and also to other sections of the sheet 30. Connectors 40 may include various configurations. FIG. 4 includes an embodiment with a body 41 that forms a pair of openings 42. Locking members 43 are attached to the body 41 and biased across each of the openings 42 to form an enclosed interior space 44. FIG. 5 includes another connector 40 with a single opening 42 and locking member 43. The connectors 40 are configured such that a force that is applied to the locking member 43 causes them to move into the interior space 44 to allow for insertion and removal of a bracket 40. In one embodiment, one or more of the connectors are carabiners.

Figure 6:
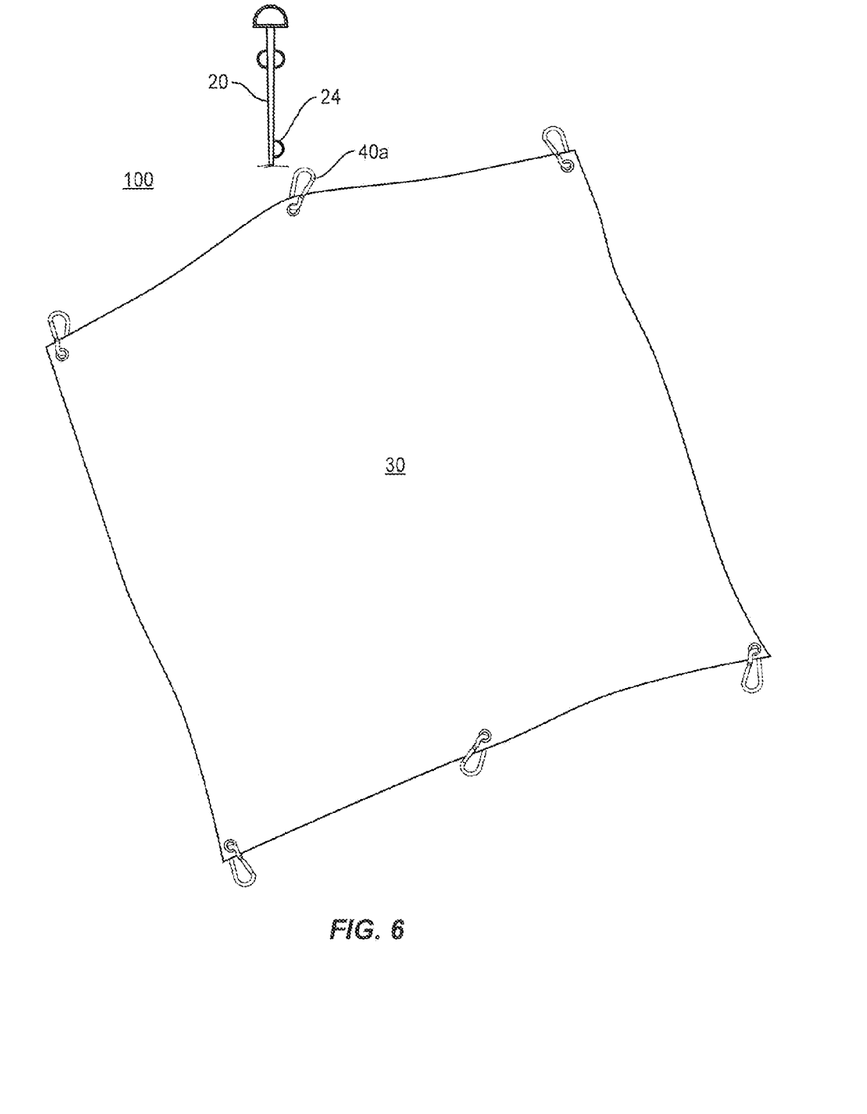
FIG. 6 is a perspective view of a device in an open orientation prior to the sheet being connected to the post.
Figure 7:
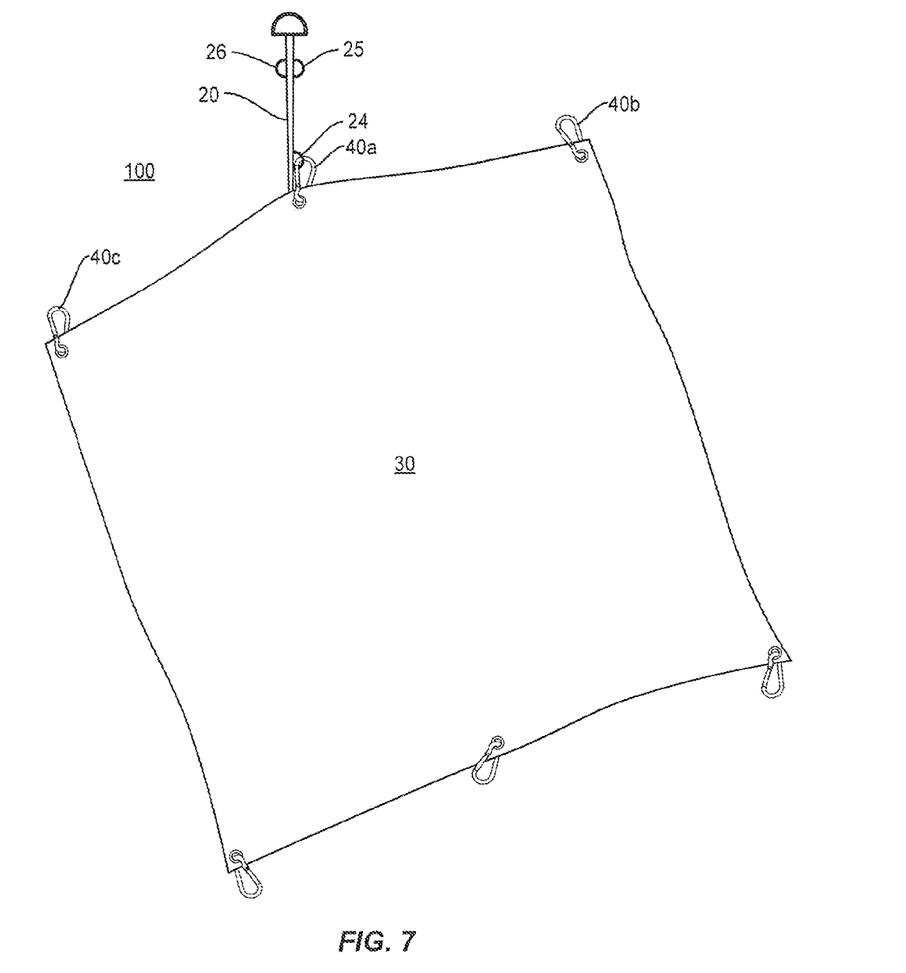
FIG. 7 is a perspective view of the device of FIG. 6 with the sheet connected to the post.
Figure 8:
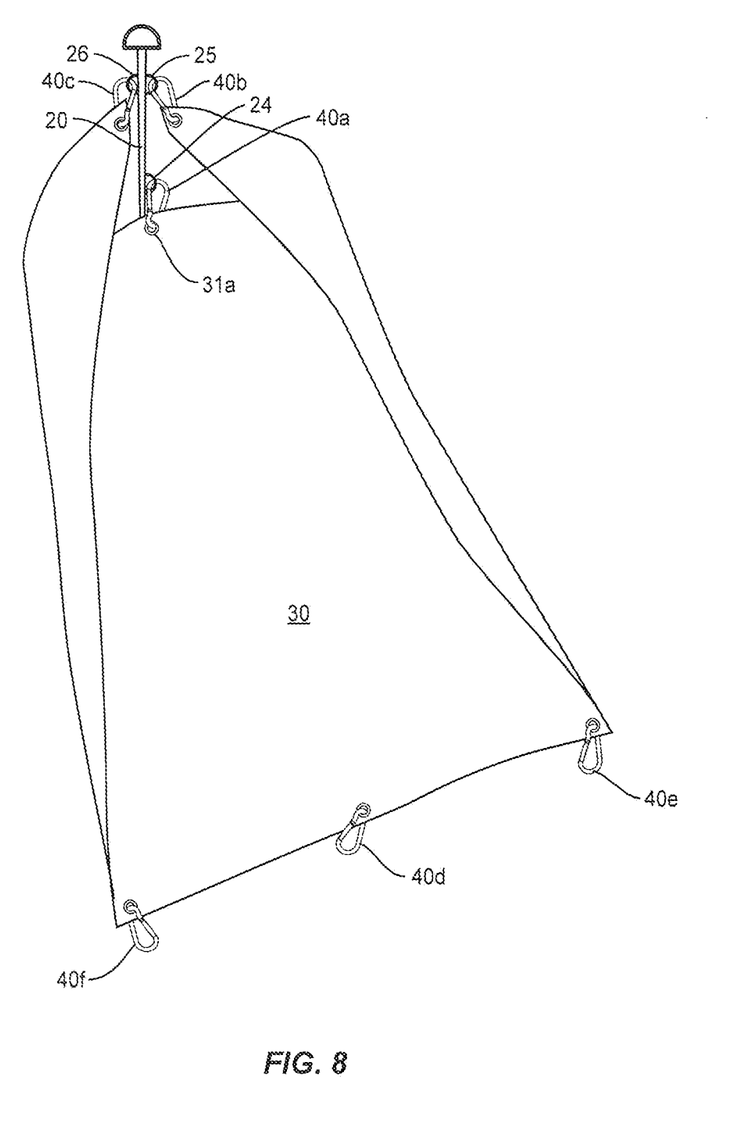
FIG. 8 is a perspective view of the device of FIG. 6 in a closed orientation.

FIGS. 6-8 illustrate how the device 10 is used to gather materials. As illustrated in FIG. 6, the post 20 is inserted into the ground 100. This includes the user applying a force to the post 20 to insert the sharpened first end 22 into the ground 100. The post 20 may be inserted various amounts into the ground 100 provided that it is supported and extends outward from the ground 20. Further, the post 20 is inserted a distance such that the lower bracket 24 remains above the ground 100 and accessible for attaching to the connector 40.

When inserted into the ground 100, ideally the post 20 extends outward and is perpendicular to the ground 100. In some instances, the post 20 may be extend outward from the ground at a slight angle, but still provide for the brackets 24, 25, 26 to be positioned above the ground 100.

In one embodiment as illustrated in FIG. 6, the post 20 is inserted into the ground 100 without being attached to the sheet 30. After the post 20 is inserted into the ground 100, the connector 40a is connected to the bracket 24 as illustrated in FIG. 7. In another embodiment, the connector 40a is attached to the bracket 24 prior to inserting the post 20 into the ground 100.

The post 20 may be inserted into the ground 100 and the connector 40a is attached to the bracket 24, the sheet 30 is spread out onto the ground 100 as illustrated in FIG. 7. Alternatively, the sheet 30 is spread out on the ground 100 prior to inserting the post 20 into the ground 100. In both instances with the sheet 30 spread out on the ground 100, the sheet 30 provides a large surface on which the user may position materials. The bracket 24 may be positioned at the ground 100 with the entirety of the sheet 100 is in contact with the ground 100. Alternatively, the bracket 24 may be positioned slightly above the ground 100 such that a limited section of the sheet 30 in proximity to the connector 40a is raised off the ground 100.

With the sheet 30 in the open position and spread out on the ground 100, the user is able to position materials onto the sheet 30. The device 10 is particularly applicable for hauling yard debris, such as leaves, grass, branches, etc. However, the device 10 may also be used for hauling various other materials, including but not limited to dirt, stones, lumber, and bricks.

After the user has placed the materials onto the sheet 30, the sheet 30 is folded over onto the materials to prevent their escape. The folding process includes attaching the front connectors 40 on the sheet 30 to the second connection section 29 of the post 20. In FIGS. 6-8, this includes attaching the connector 40b to a first front corner of the sheet to the bracket 25, and attaching the connector 40c attached to a second front corner of the sheet to the bracket 26. This positioning is illustrated in FIG. 8. In this position, the front center of the sheet 30 is attached to the lower portion of the post 20 at bracket 24, and each of the front corners of the sheet 30 are attached to the upper portion of the post 20 at brackets 25, 26 respectively. This secures the materials within the sheet 30 and prevents their inadvertent escape.

The back edge of the sheet 30 may also be secured to prevent inadvertent escape of the materials. This may include attaching the outer back corners to the back central section of the sheet 30. Using FIG. 8, this includes attaching each of the connectors 40e, 40f to the connector 40d attached to the central, back edge of the sheet 30. This further prevents escape of the materials that are positioned on the top of the sheet 30. Further, this reduces the overall width of the sheet 30 thus allowing for moving the device 10 through smaller areas, such as fence openings, between trees, etc.

In the closed orientation, the user grabs the handle 23 and lifts the post 20 from the ground 100. The user maintains a hold on the handle 23 to haul the device 10 as needed. The handle 23 provides a single location for which the user can grab the device 10. The handle 23 may be sized for holding with a single hand, or may be larger to allow a user to use two hands when grabbing the post 20. The connectors 40a, 40b, 40c are attached to the post 20 thus maintaining the device 10 in the closed orientation and preventing escape of the materials. Further, the back edge of the device 10 may also be secured with each of the outer connectors 40e, 40f begin secured to the central back connector 40d.

The front edge of the sheet at the central is attached to the post 20 and raised above the ground while the device 10 is being slid along the ground 100. This facilitates the sliding of the sheet 30 and prevents or reduces the front edge from catching on the ground 100. Further, the connection of the front outer ends of the sheet 30 to the second connection section 29 of the post 20 reduces the stress on the grommet 31 at the front central portion of the sheet 30 (e.g., grommet 31a of FIG. 8). This prevents or reduces wear and damage to this grommet 31 and adjacent sheet 30, such as the grommet 31 tearing out of the sheet 100.

Figure 9:
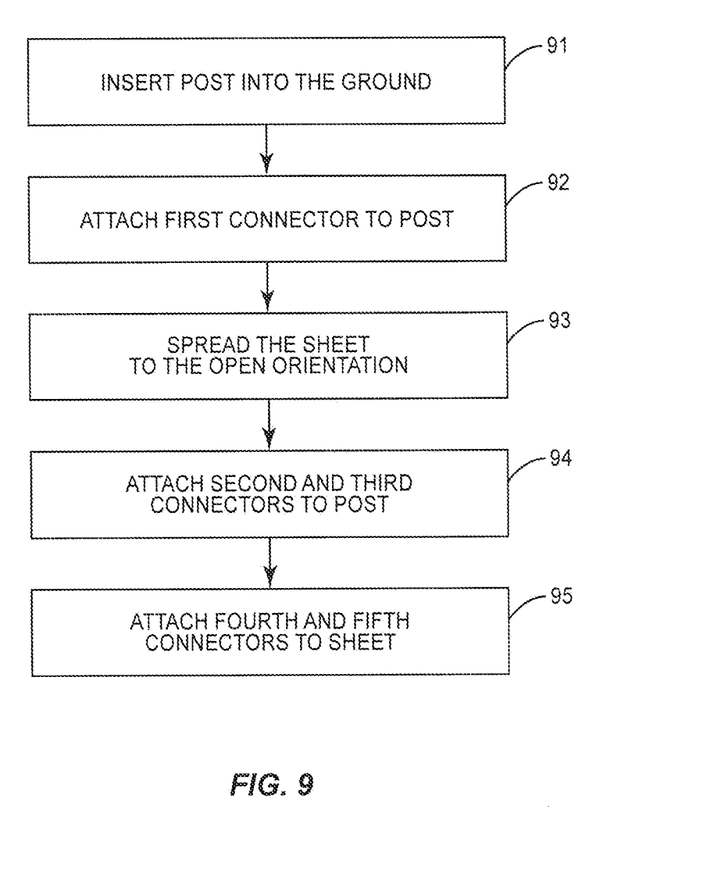
FIG. 9 is a flowchart diagram of a method of using the device to collect materials.

Once the user pulls the device 10 to the final location, the user is able to detach the connectors 40. This may include detaching connectors 40e, 40f from the central connector 40d, and connectors 40b, 40c from the respective brackets 25, 26. The user may also detach the central, front connector 40a from bracket 24, or may keep this attached. The user is then able to lift the sheet 30 and move the materials from the sheet 30.

o FIG. 9 illustrates the steps of a method of using the device 10 to collect materials. This method includes inserting the post 20 into the ground 100 at the desired location (block 91). The post 20 is inserted an amount such that it remains in an upright position when released by the user. This method then includes attaching the front central connector 40a to the lower bracket 24 (block 92). Thereafter, the sheet 30 is spread open on the ground (block 93). Once in the open orientation, the user may load materials onto the sheet 30. Once the materials are loaded, the front outer connectors 40b, 40c are attached to their respective brackets 25, 26 (block 94). The back outer connectors 40e, 40f are also moved to the closed orientation and attached to the back central connector 40d (block 95).

The user then grabs the post 20, removes it from the ground 100, and drags the device 10 to the desired location. At the desired emptying location, the sheet 30 can be opened and the materials can be removed.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of loading materials onto a collection device that includes a post with first, second, and third brackets and a sheet with a front edge, an opposing back edge, and opposing first and second lateral edges, the method comprising:
    inserting a first end of the post into the ground and positioning the post in an upright position with a first bracket of the post positioned in close proximity to the ground and second and third brackets of the post positioned farther away from the ground, each of the brackets including an enclosed interior space;
    spreading the sheet out in a flat configuration with a first connector that is attached to a central part of a front edge of the sheet being connected to the first bracket of the post;
    after the materials are loaded onto the sheet, folding the first lateral edge of the sheet over the materials and inserting a second connector that is attached to the front edge of the sheet at the first lateral edge into the interior space of the second bracket and attaching the second connector to the second bracket with the second connector positioned farther away from the ground than the first connector;
    folding the second lateral edge of the sheet over the materials and inserting a third connector that is attached to the front edge of the sheet at the second lateral edge into the interior space of the third bracket and attaching the third connector to the third bracket with the third connector positioned farther away from the ground than the first connector; and
    removing the first end of the post from the ground while the connectors remain attached to the post.

2. The method of claim 1, further comprising attaching the second and third connectors to the post at a same distance away from the first end of the post.

3. The method of claim 1, further comprising attaching a fourth connector that is attached to the back edge of the sheet at the first lateral edge onto a fifth connector that is attached to the back edge of the sheet at the central portion.

4. The method of claim 3, further comprising attaching a sixth connector that is attached to the back edge of the sheet at the second lateral edge onto the fifth connector that is attached to the back edge of the sheet at the central portion.

5. The method of claim 1, wherein the first connector is attached to the first bracket of the post after the first end of the post is inserted into the ground.

6. A method of loading materials onto a collection device that includes a post with brackets and a rectangular sheet with a front edge having first and second front corners, an opposing back edge with first and second back corners, and opposing lateral sides, the sheet also including a central portion positioned inward from the lateral sides and that extends between the front and back edges, the method comprising:
    attaching a front edge of the sheet at the central portion to the post;
    while the front edge of the sheet at the central portion is attached to the post, inserting the post into the ground and positioning the post in an upright position;
    spreading the sheet out on the ground while the sheet is attached to the post;
    thereafter, folding the first lateral edge of the sheet over the central portion of the sheet and attaching the first front corner to the post above where the front edge of the sheet at the central portion is attached to the post;
    folding the second lateral edge of the sheet over the central portion of the sheet and attaching the second front corner to the post above where the front edge of the sheet at the central portion is attached to the post; and
    removing the post from the ground while the sheet remains attached to the post.

7. The method of claim 6, wherein spreading the sheet out on the ground comprises spreading the sheet on the ground in a flat configuration.

8. The method of claim 6, wherein spreading the sheet out on the ground comprises positioning the front edge of the sheet at the central portion above the ground.

9. The method of claim 6, wherein attaching the front edge of the sheet at the central portion to the post comprises attaching a first connector that is attached to the sheet at the front edge to a first bracket on the post.

10. The method of claim 9, further comprising attaching a second connector that is attached to the first front corner of the post to a second bracket on the post, with the second bracket being positioned farther away from an end of the post that is inserted into the ground than the first bracket.

11. The method of claim 10, further comprising attaching a third connector that is attached to the second front corner of the post to a third bracket on the post, with the third bracket being positioned farther away from the end of the post that is inserted into the ground than the first bracket.

12. The method of claim 6, further comprising attaching both of the first and second back corners of the sheet to the back edge of the sheet at the central portion.

13. A device to haul materials comprising:
    an elongated post comprising:
        an elongated body with a sharpened first end and an opposing second end with a handle, the handle being wider than the body;
        a first bracket with an enclosed interior space, the first bracket extending laterally outward from the body in proximity to the first end;
        at least one additional bracket with an enclosed interior space, the at least one additional bracket extending laterally outward from the body in proximity to the handle;
    a rectangular sheet comprising a front edge with first and second corners and an opposing back edge with third and fourth corners, each of the front and back edges including three spaced-apart holes; and
    connectors mounted within each of the holes, each of the connectors including an interior space, an opening into the interior space, an elongated member that extends across the opening, and a biasing member that biases the elongated member across the opening.

14. The device of claim 13, wherein the post includes second and third brackets that are positioned an equal distance from the first bracket along the body of the post.

15. The device of claim 14, wherein the second bracket extends outward on a first lateral side of the body and the third bracket extends outward on an opposing second lateral side of the body.

* * * * *